Figure 4:
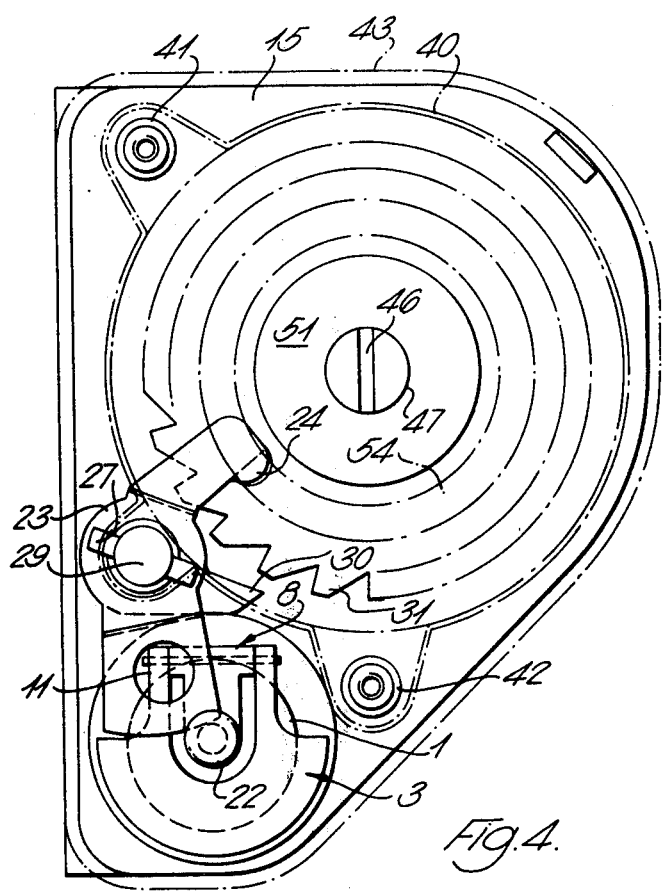

United States Patent [19]
Cunningham et al.

[11] 4,143,831
[45] Mar. 13, 1979

[54] SAFETY BELT RETRACTORS

[75] Inventors: Douglas J. Cunningham, Petersfield; Ronald F. Tilley, Walberton, both of England

[73] Assignee: Britax (Wingard) Ltd., Great Britain

[21] Appl. No.: 874,604

[22] Filed: Feb. 2, 1978

[30] Foreign Application Priority Data

Feb. 21, 1977 [GB] United Kingdom ............... 7201/77

[51] Int. Cl.$^2$ ................... A62B 35/02; B65H 75/48
[52] U.S. Cl. ................... 242/107.4 A; 242/107.4 B
[58] Field of Search ............... 242/107.4 A, 107.4 B; 297/388; 280/744–747

[56] References Cited

U.S. PATENT DOCUMENTS

| 3,680,808 | 8/1972 | Svensson ............... 242/107.4 A X |
| 3,758,044 | 9/1973 | Nilsson ............... 242/107.4 A |
| 3,942,739 | 3/1976 | Torphammar et al. ...... 242/107.4 A |

Primary Examiner—Harvey C. Hornsby
Assistant Examiner—John M. Jillions
Attorney, Agent, or Firm—J. Rodman Steele, Jr.

[57] ABSTRACT

A safety belt retractor including a spring driven belt storage shaft which is locked by either an inertia sensitive, or belt withdrawal sensitive mechanism, or both working together. The width of the retractor is reduced by using a plate-like mass or disc as an inertia sensing mass. The disc is supported, on edge, in a well of a carrier. The carrier can be located in different rotary positions, to adjust the rest position of the mass, by means of meshing gear wheels, one arrangement providing a vernier adjustment. Movement of the mass is sensed by a lever arrangement including a light strip mounted to pivot on, or to rotate with a locking pawl.

23 Claims, 5 Drawing Figures

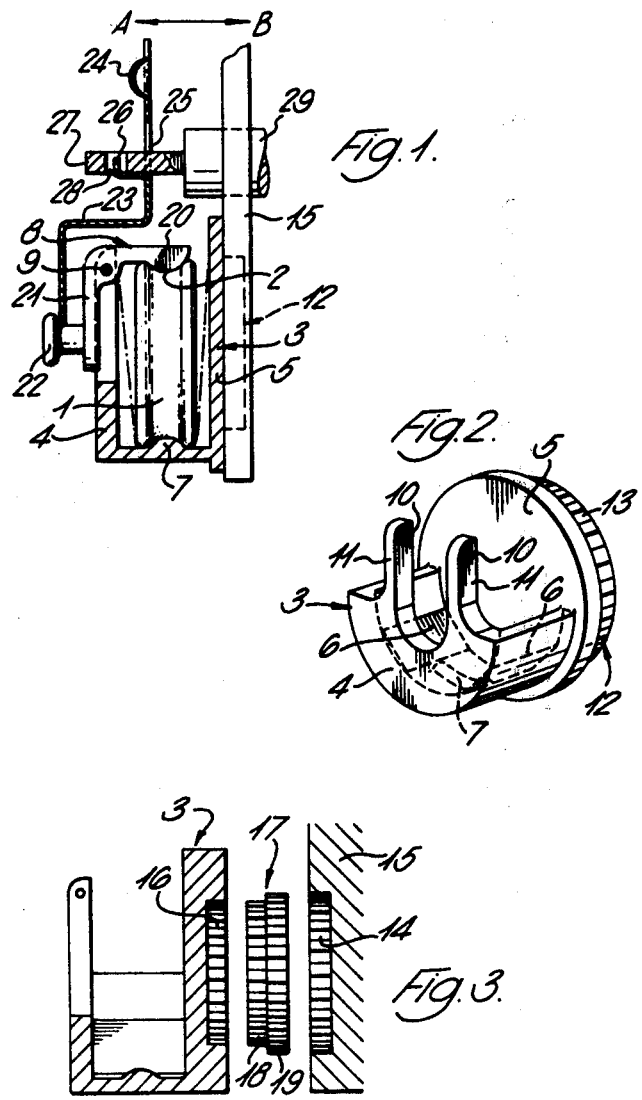

SAFETY BELT RETRACTORS

This invention relates to improvements in safety belt retractors.

It is usual, in safety belt retractors of the type comprising a belt storage reel coupled to a rewinding spring, to provide at least inertia sensitive means for locking the reel due to sudden vehicle movement, such as a deceleration. However, belt withdrawal sensitive means may also be employed to cause the reel to be locked if the belt is withdrawn rapidly from the reel. The only suitable position for mounting such locking means is at one or both ends of the reel. In the past, this has led to rather cumbersome constructions which impose limitations on installation both with regard to size and shape, as well as appearance. The invention, at least in its preferred embodiment, seeks to overcome this problem by reducing the overall dimensions of a safety belt retractor, particularly the width measured along the axis of the reel.

The speed of operation of an inertia sensitive or belt withdrawal sensitive reel locking mechanism is limited with respective regard to the delay in moving the inertia mass and the linkage connected thereto, or the delay in displacing a centrifugal member or clutch, to operate a reel locking pawl. For safety reasons, it is highly desirable to increase the speed of locking the reel. This is a further problem which at least the preferred embodiment of the invention seeks to solve.

In general, the present invention provides a safety belt retractor comprising a belt storage shaft which is rotatably mounted on a support and locking means for said shaft mounted on said support; said locking means comprising an inertia sensitive mechanism including a plate-like mass, a carrier which supports said mass on its plate-like edge, said mass being free to tilt about said edge and being free to move in another direction substantially parallel with said edge, said carrier limiting the tilting and the other movement of said mass so that it returns, by gravity, to a given rest position, and a linkage responsive to said tilting and to said other movement for locking said shaft.

Preferably, the mass is a disc of circular cross section. The linkage may include a lever which contacts the periphery of the disc to sense its movement. Suitably, the lever contacts the disc on a diameter which passes through an opposite point of contact between the disc and the carrier. Preferably, the disc has a peripheral groove with side walls which join smoothly with the floor of the groove, and the lever is located in the groove so as to ride up one or other of the side walls when the disc tilts.

Preferably, the carrier is in the form of a receptacle including a pair of opposite walls, which may be vertical or oppositely inclined, adjacent respective major faces of the plate-like mass or disc. The walls are suitably spaced to enable the mass to tilt but to limit the tilting so that the mass returns by gravity to its rest position. The disc may be centralized by inwardly tapering and oppositely inclined walls, or the grooved disc may be located on a projection between opposite vertical walls. The carrier also preferably includes a pair of oppositely inclined ramps aligned with the plate-like edge of the mass. This allows the disc to slide or roll up one or other of the ramps in response to a force parallel with the plane of the disc. A force perpendicular to this plane would cause the disc to tilt. The disc, therefore, has two degrees of freedom and may tilt or move on its edge, or both, depending on the direction of the force. The ramps may be oppositely inclined wedges or portions of a cylindrical surface. In a rest position, the plate-like mass or disc settles into the well between the ramps.

Preferably, said linkage includes a bell crank lever pivoted on the carrier, one arm of the lever contacting a periphery of the plate-like mass to sense said tilting or other movement and the second arm being linked to a locking pawl, said pawl being engageable with a toothed wheel fast with said shaft. The second arm of the bell crank lever may be connected to a second lever which is pivotable into engagement with a driven member mounted for rotation with said shaft. The second lever is connected to the locking pawl so that the locking pawl is moved, as a result of the engagement between the second lever and the driven member, to lock the shaft. The second arm of the bell crank lever is preferably connected to the second lever at a point adjacent the centre of the plate-like mass. This enables the carrier to be rotated, on the axis of said mass, to adjust its position, relative to the support for the belt storage shaft, to accommodate different positions of installations in respective vehicles. Preferably, the carrier is removably located, by co-operating rings of teeth, on the support. Its position, relative to the support, can then be varied by removing the carrier and replacing it in a different position. Both the carrier and the support may have toothed circular recesses of different diameters, the carrier being connected to the support by means of a double gear wheel having rings of teeth of corresponding diameters. The teeth may be spaced so as to provide a form of Vernier adjustment. The locking pawl may extend alongside the shaft between the driven member and the toothed wheel and it may optionally extend across the support, from one end of the shaft to the other, to engage respective toothed wheels fast with the shaft.

As mentioned above, the inertia mass is preferably a grooved disc freely mounted in a receptacle defined by the carrier, the disc being connected to a lever pivoted on the carrier. Such an arrangement facilitates assembly of the inertia sensitive mechanism when the retractor is manufactured. Moreover, the inertia sensitive mechanism may be located in a housing at one end of the shaft, so that the location enables the disc to move up and down whilst preventing it from bouncing out of the carrier. The bell crank lever in contact with the disc responds to the up and down movement whilst acting as a stop to prevent total displacement. When a bell crank lever is used and is connected to the second lever mentioned above, the second lever is preferably pivotally mounted on the locking pawl so that the locking pawl does not move when the inertia sensitive mechanism causes the second lever to pivot for engaging the driving member. Suitably, the second lever is made from flat strip material, the locking pawl being received in an aperture in the strip. The aperture is formed by striking a tongue which locates the locking pawl to permit limited pivotal movement of the second lever axially of the locking pawl whilst the shape of the aperture secures the second lever for rotation with the pawl. The locking pawl may have a flattened end which is received in the aperture, the tongue extending in contact with a surface of the flattened end and being located in a recess therein.

Suitably, a spirally coiled spring is provided for rewinding a safety belt on said shaft. The spring is mounted at one end of the shaft and is contained, together with the shaft locking means in a housing. The carrier is preferably mounted on the support so that the plate-like mass is substantially parallel with the coils of the spring and the carrier is located in a space between a side wall of the housing and the outer coil of the spring. This conserves space and provides a compact construction.

Preferably, the retractor includes belt withdrawal sensitive means to initiate locking of said shaft. Such a mechanism may have a member which is axially displaceable, with respect to the rotational axis of the shaft, when a given rate of belt withdrawal is exceeded. The linkage which responds to movement of the inertia mass is then also responsive to the axial displacement of said member to initiate locking of the shaft. As both the inertia sensitive mechanism and the belt withdrawal sensitive mechanism operate the same linkage, the speed of locking the shaft is increased. For example, if the vehicle suddenly decelerates, the safety belt is jerked along with displacement of the inertia mass. The belt withdrawal sensitive mechanism may comprise a clutch in which the drive and driven members normally rotate together on rotation of the belt storage shaft, but are disengaged, by a sudden belt withdrawal, whereby one of the members is axially displaced to operate the linkage to cause locking of the shaft. The drive member is suitably fast with the shaft and the driven member has limited rotational movement relative to the shaft but is urged into contact with the driven member so as to engage it by means of at least one respective cam and cam slot. The driven member suitably includes a plurality of teeth centred on the axis of rotation of the shaft and provided for engaging said second lever whereby the locking pawl is caused to move so as to lock the shaft. The second lever is suitably cranked so as to extend between the inertia sensitive mechanism and the belt withdrawal sensitive mechanism.

Figure 5:
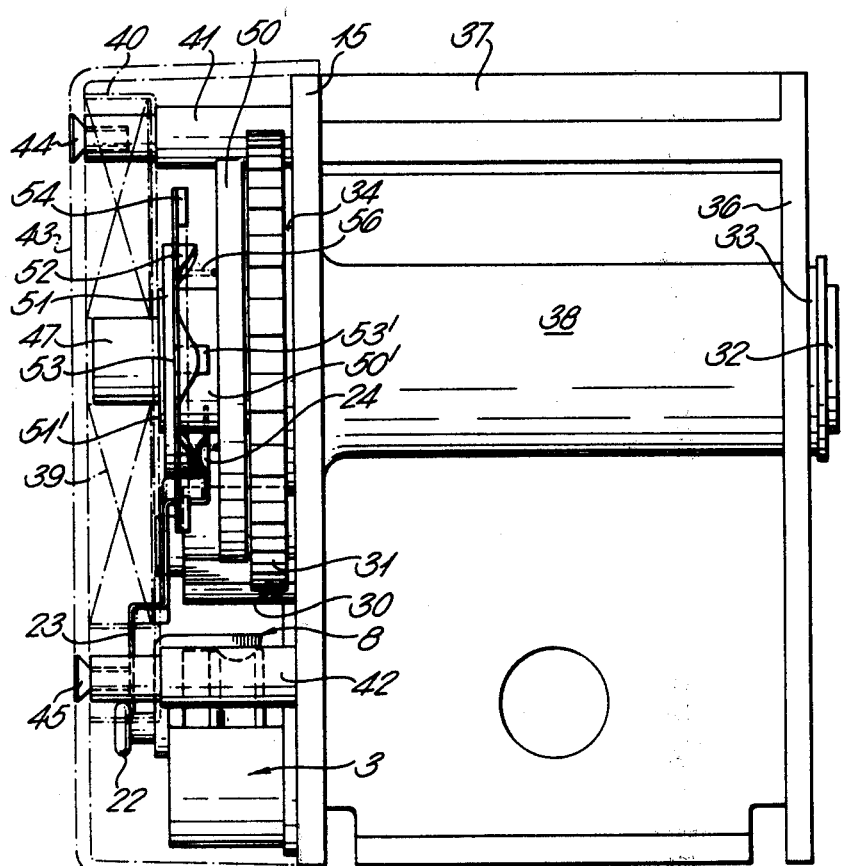

An embodiment of the invention will now be described with reference to the accompanying drawings, in which:

FIG. 1 is a sectional elevation through an inertia sensitive locking mechanism for a safety belt retractor according to the invention, FIG. 2 is a perspective view of a carrier used in the mechanism of FIG. 1, FIG. 3 is a sectional exploded view, in elevation, showing a carrier according to a further embodiment, FIG. 4 is an end elevation, and FIG. 5 is a side elevation of the retractor.

In order to assist understanding of the construction of the assembled retractor shown in FIGS. 4 and 5, a description will first be given of its inertia sensitive mechanism.

Referring to FIGS. 1 and 2, the inertia sensing mechanism has an inertia mass 1 in the form of a circular disc with a peripheral groove 2. The disc 1 rests in a carrier 3 which may be a plastics moulding. The carrier has spaced walls 4 and 5 which are either vertical, or inclined away from one another as shown by the broken lines. The carrier 3 has ramps 6 upon which disc 1 is able to slide or roll, or both, on its edge. A raised portion 7 (or the inclined walls shown by the broken lines) serves to centralise the disc 1 relative to walls 4 and 5. Mounted on the carrier 3 is a bell crank lever 8 pivoted on a pin 9 which passes through the lever and through holes 10 in trunnions 11 integral with the carrier 3.

On the rear of wall 5 is a male portion 12 having a ring of teeth 13. Portion 12 mates with a toothed recess 14 (see FIGS. 1 and 3) in a frame member 15 and is fixed to member 15 (e.g., by a screw on the centre line). Member 15 forms part of a support in the retractor of FIGS. 4 and 5. FIG. 3 shows a modification wherein the carrier 3 also has a toothed recess 16, recess 16 having a smaller diameter than recess 14. The carrier 3 is connected to the frame member 15 by a double gear wheel 17 having rings of teeth of corresponding diameters. The number of teeth in ring 18 may be one less than the number in ring 19 thereby providing a form of Vernier adjustment. The position of the carrier 3 can be adjusted, on the axis of mass 1, by selectively engaging the mating teeth. This assists the installation of the retractor in vehicles of different types whereby the position of the inertia sensitive mechanism requires adjustment. In operation, upon deceleration of the vehicle in which the retractor is mounted, the disc 1 either tilts about projection 7 (if a decelerational force is exerted in the directions of arrows A or B), or moves up the ramps 6 (FIG. 2, if a decelerational force acts in the direction of alignment of the ramps). The actual movement of the disc 1 may be a combination of tilting together with sliding and/or rolling up one of the ramps 6, if components of these forces act in the directions mentioned. In the case of tilting, or movement up one of the ramps, or both, the contact point of an arm 20 of lever 8, in the groove 2 of the disc 1, moves upwardly (with respect to FIG. 1), and pivots the other arm 21 of lever 8 inwardly towards the carrier 3.

Arm 21 has a circular section stud 22 which is centred on the axis of the circular disc 1. A second lever 23, in the form of a flat bent strip, engages the stud 22 and extends upwardly to terminate in a projection or tooth 24. Lever 23 has a rectangular aperture 25 which is formed by striking out a tongue 26. Aperture 25 receives a flattened end 27, having an aperture 28, of a locking pawl 29. Pawl 29 may have a spindle of circular section on which a locking tooth 30 (FIG. 4) is fast. Referring to FIGS. 4 and 5, the tooth 30 engages a toothed wheel 31 which is fast with a belt storage shaft 32. The lever 23 is made from flat thin strip material to reduce the weight of the linkage between the inertia mass 1 and the shaft locking pawl 29.

Referring now to FIGS. 4 and 5, the shaft 32 is supported in bearings 33, 34 in respective frame members 15, 36 of a supporting frame 37. A plastics spool 38 is mounted on and is fast with the shaft 32. The spool may have a pair of slots (not shown) which serve as an anchorage for the inner end of a length of webbing (not shown) forming the safety belt. A clock type rewinding spring 39 is mounted in a housing 40 which is attached by spacers 41, 42 to the frame member 15. The housing 40 is secured to a cover 43 by means of screws 44, 45. The outer end of the spring 39 is attached to the housing 40 and its inner end is fixed to a slot 46 in a part 47, of reduced section, of shaft 32. A flywheel 50 is rotatably mounted on the part 47 of shaft 32 and is fast with a cylindrical sleeve 50' which has a key 53'. A cam plate 51, having a series of camming projections 52 which extend towards member 15 is fast with part 47 of the shaft 32. A boss 51' of the same diameter as sleeve 50' projects outwardly from cam plate 51 and prevents the rear of the spring housing 40 from touching the back of the cam plate 51. A light disc 53 having a circumferential series of apertures or slots (as cam followers) through which respective cams 52 project, is mounted for axial movement on sleeve 50'. The disc 53 has a keyway which receives key 53' to enable such axial movement but which causes cam plate 51 to be circumferentially fast with fly wheel 50. The disc 53 has a ring of teeth 54 and is normally axially biased towards the cam plate 51 by means of a light spring 56.

If the shaft 32 is rotated slowly, the disc 53 remains axially in contact with the cam plate 51 and rotates with the shaft 32. However, if the safety belt is rapidly withdrawn, the part 47 of shaft 32 rotates rapidly and the inertia of the flywheel 50 causes it, and hence the disc 53 to lag with respect to the cam plate 51 whereby the disc 53 is caused to move axially towards the flywheel 50 against the bias of the spring 56. Thus, for an instant, the disc 53 remains stationary with respect to the rotating shaft 32 but this relative rotation is limited to the extent necessary for the required axial displacement. Disc 53 then rotates with shaft 32 so that one of the teeth 54 will then engage the tooth 24 of the lever 23. This causes the lever 23 to rotate together with the spindle of the locking pawl 29 whereby the tooth 30 is rotated into contact with one of the teeth on the wheel 31. This causes the shaft 32 to be locked against further rotation. Thus, the flywheel 50, cam plate 51 and toothed disc 53 act as a belt withdrawal sensitive mechanism for locking the shaft 32.

With regard to the inertia sensitive mechanism described with reference to FIGS. 1 and 2, tilting of the disc 1, or movement up one or other of the ramps 6 causes pivotal movement of the bell crank lever 8, which in turn causes the lever 23 to be pivoted towards the teeth 54 of the disc 53. As before with the belt withdrawal sensitive mechanism, this results in rotation of the spindle of the locking pawl 29 causing the tooth 30 to engage the toothed wheel 31 to lock the shaft 32.

In an accident, the belt withdrawal sensitive mechanism and the inertia sensitive mechanism co-operate by moving both the disc 53 as well as the lever 23 to increase the speed of locking the shaft 32.

If necessary, a further toothed wheel (similar to wheel 31) may be provided at the other end of shaft 32, adjacent frame member 36 and a pawl locking bar may extend alongside the shaft 32 between the frame members 15 and 36. However, this would increase the width of the retractor measured on the axis of shaft 32.

What we claim is:

1. A safety belt retractor comprising a belt storage shaft which is rotably mounted on a support, and locking means for said shaft mounted on said support; said locking means comprising an inertia sensitive mechanism including a plate-like mass in the form of a disc having a circular cross-section and a plate-like edge, a carrier which supports said disc on said plate-like edge, said disc being free to tilt about said edge and being free to move in another direction substantially parallel with said edge, said carrier limiting the tilting and the other movement of said disc so that it returns, by gravity, to a given rest position, a locking pawl, toothed means fast with said belt storage shaft, and a linkage responsive to said tilting and to said other movement and to rotation of said shaft for causing said locking pawl to engage said toothed means for locking said shaft, said linkage including a first lever which is pivotally supported by the carrier, said first lever having first and second portions, said first portion contacting a periphery of the disc to sense its movement, and a second lever which is coupled between said locking pawl and said second portion of said first lever, said second lever being movable by said first lever into a position where it is responsive to rotation of said shaft to cause said locking pawl to engage said toothed means.

2. A retractor according to claim 1 wherein said first portion of said first lever contacts said disc on a diameter thereof which passes through an opposite point of contact between said disc and said carrier.

3. A retractor according to claim 2 wherein said disc has a peripheral groove with side walls which join smoothly with the floor of the groove, said first portion of said first lever being located in the groove so as to ride up either one of said side walls when said disc tilts.

4. A retractor according to claim 3 wherein said carrier is in the form of a receptacle including a pair of opposite walls adjacent respective major faces of said disc.

5. A retractor according to claim 4 wherein said carrier includes a projection between said opposite walls on which the peripheral groove in said disc is located.

6. A retractor according to claim 5 wherein said walls are oppositely inclined.

7. A retractor according to claim 1 wherein said carrier includes a pair of oppositely inclined ramps aligned with the plate-like edge of said disc.

8. A retractor according to claim 1 wherein said first lever is a bell crank lever pivoted on said carrier, said first portion of said first lever being one arm thereof which contacts a periphery of said disc.

9. A retractor according to claim 8 wherein said second portion of said first lever is a second arm thereof which is provided with a circular section stud, said second lever having a free end which engages said stud.

10. A retractor according to claim 9 wherein said circular section stud is concentric with an axis through the center of said disc and further comprising means for varying the position of said carrier for adjusting the rest position of said disc.

11. A retractor according to claim 10 wherein said carrier is removably located on said support by cooperating rings of teeth, whereby its position can be varied, relative to said support.

12. A retractor according to claim 11 wherein said linkage comprises a driven member fast with said shaft, said second lever engaging said driven member, when said linkage responds to said tilting and to said other movement of said disc, whereby said second lever is moved to cause said locking pawl to engage said toothed means for locking said shaft.

13. A retractor according to claim 12 wherein said second lever is pivotally mounted on said locking pawl so that said locking pawl does not move when the inertia sensitive mechanism causes said second lever to pivot for engaging said driven member.

14. A retractor according to claim 11 wherein said second lever is made from flat strip material, said locking pawl being received in an aperture in said flat strip, which aperture is formed by striking a tongue which locates said locking pawl to permit limited pivotal movement of said second lever axially of said locking pawl while the shape of said aperture is capable of securing said second lever for rotation with said locking pawl.

15. A retractor according to claim 11 wherein said pawl has a flattened end which is received in said aperture, the tongue extending in contact with a surface of said flattened end and being located in a recess therein.

16. A retractor according to claim 1 wherein a spirally coiled spring, for rewinding said shaft, is mounted at one end of said shaft, said spring and said shaft locking means being contained in a housing, said carrier being mounted on the support so that said disc is substantially parallel with the coils of the spring and said carrier being located in a space between a side wall of the housing and the outer coil of the spring.

17. A retractor according to claim 1 including a belt withdrawal sensitive mechanism to initiate locking of said shaft, said mechanism having a member which is axially displaceable, with respect to the rotational axis of the shaft, when a given rate of belt withdrawal is exceeded, said linkage being responsive to either said tilting or to said other movement of said disc, or to the axial displacement of said member, or to both, to initiate the locking of said shaft.

18. A retractor according to claim 1, further comprising a belt withdrawal sensitive mechanism to initiate locking of said shaft when a given rate of belt withdrawal is exceeded, said mechanism comprising a clutch in which the drive and driven members normally rotate together on rotation of the shaft, but are disengaged by sudden belt withdrawal, whereby one of the members is axially displaced to operate the linkage to cause locking of the shaft.

19. A retractor according to claim 18 wherein the drive member is fast with said shaft and the driven member has limited rotational movement relative to said shaft but is urged into contact with the drive member, the drive and driven members normally engaging by means of at least one respective cam and cam follower.

20. A retractor according to claim 18 or 19 wherein the driven member includes a plurality of teeth centered on the axis of rotation of said shaft and provided for engaging said second lever whereby said locking pawl is caused to move so as to lock said shaft.

21. A retractor according to claim 20 wherein said second lever is cranked so as to extend between said inertia sensitive mechanism and said belt withdrawal sensitive mechanism.

22. A retractor according to claim 1 wherein said second lever engages said second portion of said first lever adjacent to the center of said disc and further comprising means for varying the position of said carrier for adjusting the rest position of said disc.

23. A retractor according to claim 22 wherein said carrier is removably located on said support by cooperating rings of teeth, whereby its position can be varied relative to said support.

* * * * *